(12) United States Patent
Leroy et al.

(10) Patent No.: US 8,355,386 B2
(45) Date of Patent: Jan. 15, 2013

(54) OPTIMIZED ESTIMATION OF POWER FOR THE TRANSPORT FORMAT SELECTION OF A UMTS HANDSET

(75) Inventors: Arnaud Leroy, Paris (FR); Pierre Marchand, Courbevoie (FR)

(73) Assignee: NEC Corporation, Tokyo (JP)

( * ) Notice: Subject to any disclaimer, the term of this patent is extended or adjusted under 35 U.S.C. 154(b) by 874 days.

(21) Appl. No.: 12/086,057

(22) PCT Filed: Dec. 15, 2006

(86) PCT No.: PCT/JP2006/325569
§ 371 (c)(1),
(2), (4) Date: Jun. 5, 2008

(87) PCT Pub. No.: WO2007/069788
PCT Pub. Date: Jun. 21, 2007

(65) Prior Publication Data
US 2009/0285187 A1 Nov. 19, 2009

(30) Foreign Application Priority Data
Dec. 15, 2005 (EP) .................... 05112251

(51) Int. Cl.
*H04J 3/00* (2006.01)
(52) U.S. Cl. .................... 370/336; 370/345
(58) Field of Classification Search .......... 370/336
See application file for complete search history.

(56) References Cited

U.S. PATENT DOCUMENTS

| 6,904,290 B1 | 6/2005 | Palenius |
| 2006/0111119 A1 | 5/2006 | Iochi |
| 2007/0091852 A1* | 4/2007 | Malladi et al. ............... 370/332 |

FOREIGN PATENT DOCUMENTS

| JP | 2003-510950 | 3/2003 |
| JP | 2005-64872 | 3/2005 |
| WO | WO 2005/020465 A1 | 3/2005 |

OTHER PUBLICATIONS

Second Chinese Office Action dated Mar. 21, 2012 (with an English translation).

* cited by examiner

*Primary Examiner* — Derrick Ferris
*Assistant Examiner* — Shripal Khajuria
(74) *Attorney, Agent, or Firm* — McGinn IP Law Group, PLLC

(57) ABSTRACT

The invention concerns a method for optimizing the Transport Format Combination (TFC) selection procedure processed by a user equipment UE in an uplink communication in a mobile telecommunication network, wherein the TFC procedure during the current TTI (Time Transport Interval) at instant t+1 is performed in function of:
  a—the remaining power (2) measured after the TFC procedure performed in the past TTI at instant t,
  b—the power (4) for transmitting the E-DCH channels in the past TTI at instant t, and
  c—a minimum specified power (6) for transmitting the E-DCH channels in the next TTI.

5 Claims, 1 Drawing Sheet

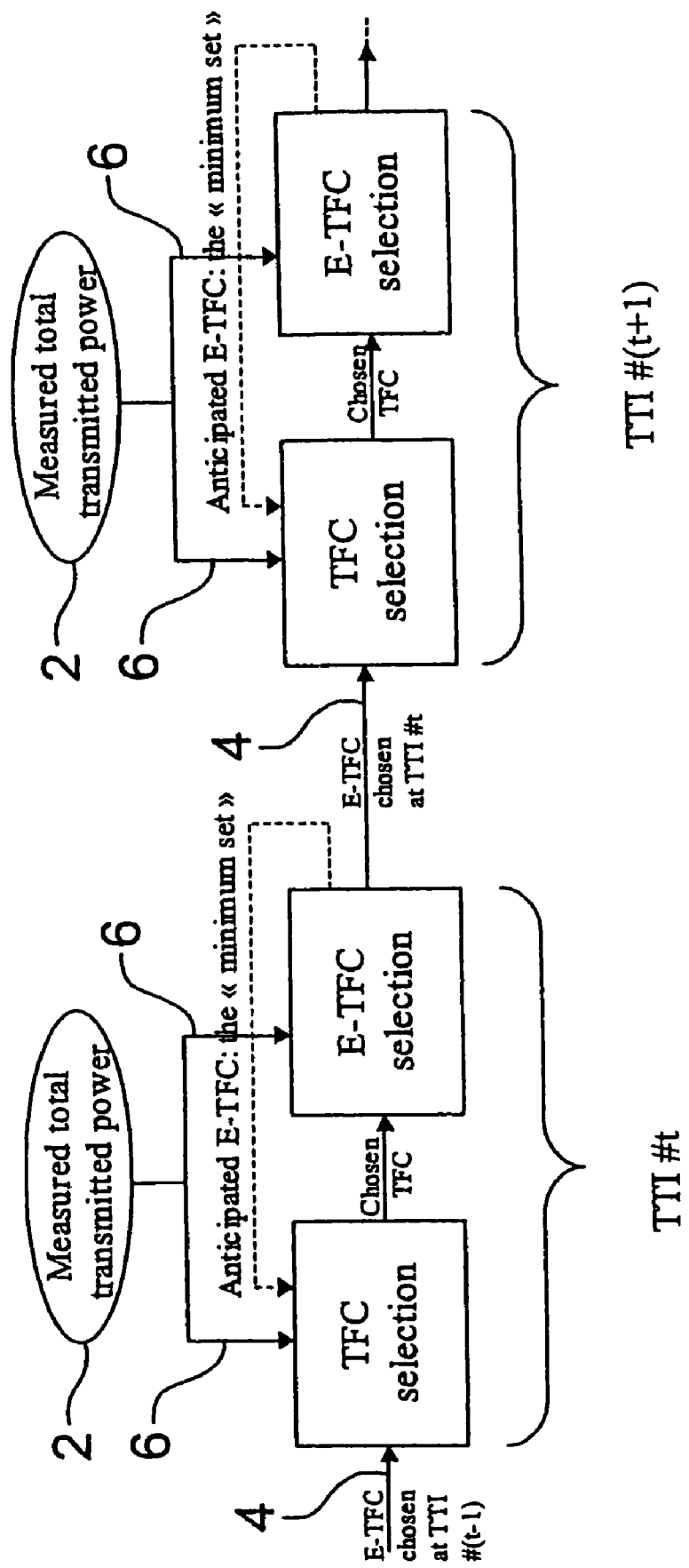

OPTIMIZED ESTIMATION OF POWER FOR THE TRANSPORT FORMAT SELECTION OF A UMTS HANDSET

TECHNICAL DOMAIN

The present invention pertains to telecommunication fields and concerns a method for optimising the estimation by a user Equipment (UE) of the remaining available power for the Transport Format Combination (TFC) selection.

More precisely, the invention concerns a method for optimising the Transport Format Combination (TFC) selection procedure processed by a user equipment (UE) in an uplink communication in a mobile telecommunication network.

The invention concerns also a user equipment (UE) comprising means for optimising the Transport Format Combination (TFC) selection procedure processed by a user equipment (UE) in an uplink communication in a mobile telecommunication network.

STATE OF PRIOR ART

In a mobile communication network such as UMTS, UE (User Equipment) is provided with a limited amount of power for transmitting different class of traffic channels during an uplink communication, each channel transporting different services and/or signalling data which necessitates specific rate and/or QoS (Quality of Service).

At each elementary transmission time interval (TTI), the UE selects a sub-rate for each channel by selecting a TFC (Transport Format Combination).

The selection of the TFC (Transport Format Combination) to be used in the uplink during each TTI is under the control of the MAC (Medium Access Control) layer of the UE which selects the TFC according not only to the data available to be sent and the priority of the flows to which the data belongs, but also to the conditions of the radio channel.

In the current TFC selection scheme, since DCH (Dedicated Control Channel) channels are considered with a higher priority than E-DCH (Enhanced DCH), it is admitted that:
  TFC restriction/selection is performed before E-TFC (Enhanced Transport Format Combination for the E-DCH channel) restriction/selection,
  the remaining available power is allocated first to DCH channel, and then to E-DCH channel.

It is to be noted that the current 3GPP standard specification requires that the E-DCH channel must be transmitted at least with a minimum specified bit rate (referred as the "E-TFC$_{min}$"). Therefore, not taking into account the E-DCH power contribution when performing TFC selection may lead to frequent power shortage situations, since the E-TFC selection must at least select the "E-TFC$_{min}$" for the upcoming transmission. One of the main reasons for power shortage is the imperfect estimation of the remaining power. Since power shortage automatically leads to some compression at the physical level, and this in turn leads to several system performance losses including:
  unnecessary retransmission of E-DCH,
  increased packet delay,
  waste of Node-B resources,
  loss of uplink capacity.

Consequently, there is absolutely no warranty that enough power is left by the TFC selection stage to ensure the transmission of this E-TFC$_{min}$.

It is therefore desirable to optimise the TFC selection scheme to cope with the above described problems when E-DCH channel is active.

PRESENTATION OF THE INVENTION

The object of the invention is achieved by means of a method for optimising the Transport Format Combination (TFC) selection procedure processed by a user equipment UE in an uplink communication in a mobile telecommunication network, wherein the Transport Format Combination (TFC) procedure during the current TTI (Time Transport Interval) at instant t+1 is performed in function of the:
  a—the remaining power measured after the TFC procedure performed in the past TTI at instant t,
  b—the power for transmitting the E-DCH channels in the past TTI at instant t, and,
  c—a minimum specified power for transmitting the E-DCH channels in the next TTI.

With this method, when the TFC selection process has to decide if a given TFC can be transmitted in the upcoming TTI provided that the remaining power is not exceeded, three major contributions are considered:
  1—the total estimated (measured) transmitted power;
  2—the contribution of all transmitted channels in the past TTI;
  3—the anticipated contribution of all transmitted channels in the next TTI, including the candidate TFC.

In this process, the contribution of the E-DCH is taken into account in step 2 and 3.

In the past TTI, the E-TFC procedure that was used for estimating the transmission power of the E-DCH channels during the past TTI is known. This power is included in the sum of powers used for all the transmitted channels. In the upcoming TTI, the E-TFC that will be used for estimating the transmission power of the E-DCH channels during the next TTI is not known, but is considered to be equal to the "E-TFC$_{min}$" defined by the standard (computed with the power offset of MAC-d flow with the logical channel on which highest priority is mapped).

According to the invention, the power for transmitting the E-DCH channels in the $(K)^{th}$ TTI comprises the contribution power for transmitting the E-DPDCH channels and the contribution power for transmitting the E-DPCCH channels.

According to another aspect of the invention, the power measured after the TFC procedure performed in the $(K-1)^{th}$ TTI comprises the contribution power of the HS-DPCCH channel.

The User Equipment according to the invention comprises means for performing a TFC procedure and an E-TFC procedure during a TTI taking into account the power for transmitting the E-DCH channels in the past TTI, and a minimum specified power for transmitting the E-DCH channels in the next TTI.

BRIEF DESCRIPTION OF THE FIGURE

The novel features believed characteristic of the invention are set forth in the appended claims. The invention itself, further objectives, advantages thereof, will be best understood by reference to the following detailed description when read in conjunction with FIG. 1 describing a flow chart illustrating the method according to the invention.

DETAILED PRESENTATION OF PARTICULAR EMBODIMENTS

The following description is made in the case where the User Equipment (UE) is a release 6 UMTS handset, for example, able to transmit both E-DCH and classical DCH and HSDPA channels in a UMTS network.

During an uplink communication with base station of the network, the UE performs a Transport Format Combination (TFC) selection procedure and an E-TFC (Enhanced TFC) selection procedure to provide appropriate power transmission for the channels to be transmitted.

For this purpose, as illustrated in FIG. 1, the (TFC) procedure during the current TTI (Time Transport Interval) at instant t+1 is performed in function of the:

a—the remaining power 2 measured after the TFC procedure performed in the past TTI at instant t, b—the power 4 for transmitting the E-DCH channels in the past TTI at instant t, and, c—a minimum specified power 6 for transmitting the E-DCH channels in the next TTI.

The power for transmitting the E-DCH channels comprises the contribution power for transmitting the E-DPDCH channels and the contribution power for transmitting the E-DPCCH channels.

Let TxPower (t+1, k) be the UE Tx power in the $(t+1)^{th}$ TTI, if the $k^{th}$ TFC in the TFCs is chosen. This power can be expressed in function of the TxPower(t) in the $t^{th}$ TTI thanks to the expression below:

$$TxPower(t+1, k) \cong$$

$$TxPower(t) * \frac{\left[1 + F_{hs,t+1}\left(\left(\frac{\beta_{hs}}{\beta_c}\right)^2\right) + F_{d,t+1}\left(\left(\frac{\beta_d}{\beta_c}\right)^2_k\right) + F_{ec,t+1}\left(\left(\frac{\beta_{ec}}{\beta_c}\right)^2\right) + F_{ed,t+1}\left(\left(\frac{\beta_{ed}}{\beta_c}\right)^2_{MinimumSet}\right)\right]}{\left[1 + F_{hs,t}\left(\left(\frac{\beta_{hs}}{\beta_c}\right)^2_{currentHS-DPCCH}\right) + F_{d,t}\left(\left(\frac{\beta_d}{\beta_c}\right)^2_{currentTFC}\right) + F_{ec,t}\left(\left(\frac{\beta_{ec}}{\beta_c}\right)^2_{currentE-TFC}\right) + F_{ed,t}\left(\left(\frac{\beta_{ed}}{\beta_c}\right)^2_{currentE-TFC}\right)\right]}$$

and the corresponding expression in dB is:

$$P_{TxPower}(t+1, k) \cong \quad (0)$$

$$P_{TxPower}(t) + 10\log_{10}\left(\begin{array}{l}1 + F_{hs,t+1}\left(\left(\frac{\beta_{hs}}{\beta_c}\right)^2\right) + F_{d,t+1}\left(\left(\frac{\beta_d}{\beta_c}\right)^2_k\right) + \\ F_{ec,t+1}\left(\left(\frac{\beta_{ec}}{\beta_c}\right)^2\right) + F_{ed,t+1}\left(\left(\frac{\beta_{ed}}{\beta_c}\right)^2_{MinimumSet}\right)\end{array}\right) -$$

$$10\log_{10}\left(\begin{array}{l}1 + F_{hs,t}\left(\left(\frac{\beta_{hs}}{\beta_c}\right)^2_{currentHS-DPCCH}\right) + F_{d,t}\left(\left(\frac{\beta_d}{\beta_c}\right)^2_{currentTFC}\right) + \\ F_{ec,t}\left(\left(\frac{\beta_{ec}}{\beta_c}\right)^2_{currentE-TFC}\right) + F_{ed,t}\left(\left(\frac{\beta_{ed}}{\beta_c}\right)^2_{currentE-TFC}\right)\end{array}\right)$$

where:

$P_{TxPower}(t) = 10 \log_{10}(TxPower(t))$ is the current UE Tx Power in the current TTI;

$\beta_d$ is the gain factor on each DPDCH;

$\beta_c$ is the gain factor on the DPCCH;

$\beta_{ed}$ is the gain factor on the E-DPDCHs;

$\beta_{ec}$ is the gain factor on the E-DPCCH;

$\beta_{hs}$ is the gain factor on the HS-DPCCH;

$F_{hs,t}(y) = y$ if HS-DPCCH exists in next $t^{th}$ TTI and 0 otherwise $$F_{d,t}\left(\left(\frac{\beta_d}{\beta_c}\right)^2_k\right) = \sum_{j=0}^{NbDPDCH_{TFCK}} \left(\frac{\beta_d}{\beta_c}\right)^2_k = NbDPDCH_{TFCK} * \left(\frac{\beta_d}{\beta_c}\right)^2_k$$

in $t^{th}$ TTI if there are data to send on DPDCH with $k^{th}$ TFC and 0 otherwise.

$NbDPDCH_{TFCK}$ corresponds to the number of DPDCH used for sending data of $k^{th}$ TFC. The gain factor for each DPDCH is the same on each $DPDCH_j$.

$F_{ec,t}(y) = NbE\text{-}DPCCH * y$ where $NbE\text{-}DPCCH = 1$ if E-DPCCH is configured, 0 otherwise;

$$F_{ed,t} = \left(\left(\frac{\beta_{ed}}{\beta_c}\right)^2_{MinimumSet}\right) = \sum_{j=0}^{NbE\text{-}DPDCH_{TFCMinimumSet}} \left(\frac{\beta_{ed}}{\beta_c}\right)^2_{MinimumSet} =$$

$$NbE\text{-}DPDCH_{TFCMinimumSet} * \left(\frac{\beta_{ed}}{\beta_c}\right)^2$$

in $t^{th}$ TTI if there are data to send on E-DPDCH, and equal to 0 otherwise;

$$\left(\frac{\beta_{ed}}{\beta_c}\right)$$

corresponds to the gain factor ratio of one E-DPDCH and $NbE\text{-}DPDCH_{TFCMinimumSet}$ corresponds to number of E-DPDCH used for the E-$TFC_{MinimumSet}$. Since it is the minimum set (so it corresponds to a low data rate), the number of E-DPDCH should be equal to 1.

In the general expression (0) above, the transmitted power in the $t^{th}$ TTI, $P_{Txpower}(t)$, is known because it corresponds to the measure (provided by the DSP) of the total Tx power over the past TTI. The difference between this measured power and the sum of power of all channels transmitted in the $t^{th}$ TTI gives the power of the DPCCH, i.e.:

$$P_{DPCCH}(t) \cong P_{TxPower}(t) -$$

$$10\log_{10}\left(\begin{array}{l}1 + F_{hs,t}\left(\left(\frac{\beta_{hs}}{\beta_c}\right)^2_{currentHS-DPCCH}\right) + F_{d,t}\left(\left(\frac{\beta_d}{\beta_c}\right)^2_{currentTFC}\right) + \\ F_{ec,t}\left(\left(\frac{\beta_{ec}}{\beta_c}\right)^2_{currentE-TFC}\right) + F_{ed,t}\left(\left(\frac{\beta_{ed}}{\beta_c}\right)^2_{currentE-TFC}\right)\end{array}\right)$$

It is to be noted that it is not specified in the standard if the respective powers of the E-DPCCH and E-DPDCH during the past TTI (i.e. $\beta_{ed}$ and $\beta_{ec}$) should be taken into account in the computation of $P_{DPCCH}(t)$.

The standard specifies that the TFC selection is unchanged. Thus, an accurate computation of $P_{DPCCH}(t)$ must take into account $\beta_{ed}$ and $\beta_{ec}$ as the expression above shows.

So (0) can be rewritten into:

$$P_{TxPower}(t+1) \cong$$

$$P_{DPCCH}(t) + 10\log_{10}\left(\begin{array}{l} 1 + F_{hs,t+1}\left(\left(\frac{\beta_{hs}}{\beta_c}\right)^2\right) + F_{d,t+1}\left(\left(\frac{\beta_d}{\beta_c}\right)^2_k\right) + \\ F_{ec,t+1}\left(\left(\frac{\beta_{ec}}{\beta_c}\right)^2\right) + F_{ed,t+1}\left(\left(\frac{\beta_{ed}}{\beta_c}\right)^2_{MinimumSet}\right) \end{array}\right)$$

and isolating the $\beta_d/\beta_c$ ratio raises:

$$F_{d,t+1}\left(\left(\frac{\beta_d}{\beta_c}\right)^2_k\right) = 10^{\left(\frac{P_{TxPower}(t+1)-P_{DPCCH}(t)}{10}\right)} - 1 - \quad (1)$$

$$F_{hs,t+1}\left(\left(\frac{\beta_{hs}}{\beta_c}\right)^2\right) - F_{ec,t+1}\left(\left(\frac{\beta_{ec}}{\beta_c}\right)^2\right) - F_{ed,t+1}\left(\left(\frac{\beta_{ed}}{\beta_c}\right)^2_{MinimumSet}\right)$$

It can be seen that even if the TFC selection is done before the E-TFC selection, a minimum amount of the Tx power is left free for HS-DPCCH and E-DCH, since a minimum set is defined for E-DCH. Since the E-TFCs belonging to the minimum set can not be blocked, if TFC selection uses all the UE Tx power available, and if thereafter the E-TFC selection has to select anyway a minimum E-TFC, the UE Tx power will finally be higher the maximum allowed power. This is called a power shortage situation and is not desirable. Similarly, a certain amount of power is left free for the E-DPCCH which should be always transmitted if E-DCH is active. Note that taking into account a certain power allocation for the $\beta_{ec}$ and $\beta_{edmin}$ gains in the upcoming TTI is not specified in the standard.

From expression (1), the maximum allowed $\beta_d/\beta_c$ ratio is straightforward given as a function of $P_{MaxTxPower}$ (i.e. the maximum allowed UL Tx Power):

$$F_{d,t+1}\left(\left(\frac{\beta_d}{\beta_c}\right)^2_{Max}\right) = 10^{\left(\frac{P_{MaxTxPower}-P_{DPCCH}(t)}{10}\right)} - 1 - \quad (2)$$

$$F_{hs,t+1}\left(\left(\frac{\beta_{hs}}{\beta_c}\right)^2\right) - F_{ec,t+1}\left(\left(\frac{\beta_{ec}}{\beta_c}\right)^2\right) - F_{ed,t+1}\left(\left(\frac{\beta_{ed}}{\beta_c}\right)^2_{MinimumSet}\right)$$

For each $k^{th}$ TFC if $P_{TxPower}(t+1,k) > P_{MaxTxPower}$ then the TFC is in blocked state otherwise it is in supported state.

The ordering of UE Tx power for all the TFCs can be done along the $$\frac{\beta_d}{\beta_c}$$

value. If a TFC is in blocked state, all the TFCs having a higher gain factor ratio $$\frac{\beta_d}{\beta_c}$$

are also in blocked state. If a TFC is in supported state, all the TFCs having a smaller gain factor ratio $$\frac{\beta_d}{\beta_c}$$

are also in supported state. So, in order to know the state of all TFCs, it is only necessary to identify where is the frontier between supported and blocked TFCs. And the threshold specific to this frontier is given by $$\left(\frac{\beta_d}{\beta_c}\right)_{max}$$

value. All TFCs having $$\frac{\beta_d}{\beta_c} > \left(\frac{\beta_d}{\beta_c}\right)_{max}$$

are in blocked state and all the others are in supported state.

The last step of the TFC selection (i.e. selecting the most appropriate TFC among supported ones, knowing the amount of data to be transmitted) is performed as in Release 99.

An example can be taken to outline the algorithm.

Let assume the UE is in the following conditions in the next Tti(t+1):

$PDPCCH = 14$ dBm $PtxPower = 24$ dBm $\frac{\beta_{hs}}{\beta_c} = 30/15$ $\frac{\beta_{ec}}{\beta_c} = 30/15$ $\left(\frac{\beta_{ed}}{\beta_c}\right)_{MinimumSet} = \frac{2}{15}$ HS-DPCCH is present so $F_{hs,t+1}(y) = y$ NB: the minimum set for E-DCH corresponds to E-TFC(s) (E-DPDCH transport format combination(s)) which can not be forbidden due to UE Tx power constrain. Each E-TFC(s) have a gain factor ratio $$\left(\frac{\beta_{ed}}{\beta_c}\right)$$

for E-DPDCH/DPCCH. The E-TFC among minimum set which has the bigger gain factor ratio $$\left(\frac{\beta_{ed}}{\beta_c}\right)$$

for E-DPDCH/DPCCH (compatible with the data available in the UE) is called $$\left(\frac{\beta_{ed}}{\beta_c}\right)_{MinimumSet}.$$

In case no UE Tx power is reserved for E-DPDCH during TFC selection on DPDCH (i.e. in case the innovation is not implemented), it means all the available UE Tx power is available for DPDCH (except the part which is let to HS-DPCCH).

So $\left(\frac{\beta_d}{\beta_c}\right)^2_{max}$ which corresponds to the maximum allowed gain power ratio for DPDCH/DPCCH is given by:

$$\left(\frac{\beta_d}{\beta_c}\right)^2_{max} = 10^{\left(\frac{PtxPower-PDPCCH}{10}\right)} - 1 - \left(\frac{\beta_{hs}}{\beta_c}\right)^2$$

$$= 10^{\left(\frac{(24-14)}{10}\right)} - 1 - \left(\frac{30}{15}\right)^2$$

$$= 10 - 5 = 5$$

Since $$\left(\frac{\beta_d}{\beta_c}\right)^2_{max}$$

(for DPDCH/DPCCH gain power ratio) is equal to 5 it means the maximum authorized, DPDCH/DPCCH gain power ratio is equal to 5.

So, a TFC for which the power ratio $$\left(\frac{\beta_d}{\beta_c}\right)^2$$

equals to 1 is authorized (as 1 is smaller than 5).

Now the remaining UE Tx power is left in priority for HS-DPCCH then for E-DPCCH and then for E-DPDCH.

To transmit the HS-DPCCH, the corresponding gain factor ratio $$\frac{\beta_{hs}}{\beta_c}$$

is equal to 30/15. And the same value of gain factor ratio also applies to transmit the E-DPCCH.

So the maximum gain power ratio $$\left(\frac{\beta_{ed}}{\beta_c}\right)^2_{max}$$

for E-DPDCH/DPCCH (using expression β) is equal to:

$$\left(\frac{\beta_{ed}}{\beta_c}\right)^2_{Max} = 10^{\left(\frac{PtxPower-PDPCCH}{10}\right)} - 1 - \left(\frac{\beta_{hs}}{\beta_c}\right)^2 - \left(\frac{\beta_{ec}}{\beta_c}\right)^2 - \left(\frac{\beta_d}{\beta_c}\right)^2$$

$$= 10^{\left(\frac{(24-14)}{10}\right)} - 1 - \left(\frac{30}{15}\right)^2 - \left(\frac{30}{15}\right)^2 - \left(\frac{15}{15}\right)^2 = 0$$

So there is no UE Tx power left to transmit the E-DPDCH though a minimum set is defined for E-DCH and so a minimum E-DCH data rate should be allowed in any case.

To avoid this problem, when computing the maximum gain power ratio $$\left(\frac{\beta_d}{\beta_c}\right)^2_{max}$$

for DPDCH/DPCCH, the minimum needed UE Tx power which has to be left for HS-DPCCH, E-DPCCH and E-DPDCH has to be taken into account.

From expression β the maximum allowed gain power ratio $$\left(\frac{\beta_d}{\beta_c}\right)^2_{max}$$

is:

$$\left(\frac{\beta_d}{\beta_c}\right)^2_{max} = 10^{\left(\frac{(PtxPower-PDPCCH)}{10}\right)} - 1 - \left(\frac{\beta_{hs}}{\beta_c}\right)^2 - \left(\frac{\beta_{ec}}{\beta_c}\right)^2 - \left(\frac{\beta_{ed}}{\beta_c}\right)^2_{MinimumSet}$$

$$\left(\frac{\beta_d}{\beta_c}\right)^2_{Max} = 10^{\left(\frac{(24-14)}{10}\right)} - 1 - \left(\frac{30}{15}\right)^2 - \left(\frac{30}{15}\right)^2 - \left(\frac{2}{15}\right)^2$$

$$\left(\frac{\beta_d}{\beta_c}\right)^2_{Max} = \frac{221}{15^2}$$

The quantized gain factor ratio authorized in Recommendation are: 1/15, 2/15, 3/15, 4/15 ... 14/15, 1. So the maximum quantized gain factor ratio $$\left(\frac{\beta_d}{\beta_c}\right)_{Max}$$

value is:

$$\left(\frac{\beta_d}{\beta_c}\right)_{Max} = \left(\frac{14}{15}\right) \text{ as } 14^2 < 221 < 15^2.$$

Then the TFC selection process selects a TFC for which the gain factor ratio satisfies the following condition:

$$\left(\frac{\beta_d}{\beta_c}\right) \leq \left(\frac{14}{15}\right).$$

Once the TFC is chosen, it is possible to compute the maximum authorized gain factor ratio $$\left(\frac{\beta_{ed}}{\beta_c}\right)_{Max}.$$

So if the TFC selected on DCH has a gain factor ratio such that $$\left(\frac{\beta_d}{\beta_c}\right) = \left(\frac{14}{15}\right)$$

the maximum gain power ratio $$\left(\frac{\beta_{ed}}{\beta_c}\right)^2_{Max}$$

is equal to:

$$\left(\frac{\beta_{ed}}{\beta_c}\right)^2_{Max} = 10^{\left(\frac{(PixPower-PDPCCH)}{10}\right)} - 1 - \left(\frac{\beta_{hs}}{\beta_c}\right)^2 - \left(\frac{\beta_{ec}}{\beta_c}\right)^2 - \left(\frac{\beta_d}{\beta_c}\right)^2$$

$$\left(\frac{\beta_{ed}}{\beta_c}\right)^2_{Max} = 10^{\left(\frac{(24-14)}{10}\right)} - 1 - \left(\frac{30}{15}\right)^2 - \left(\frac{30}{15}\right)^2 - \left(\frac{14}{15}\right)^2$$

$$\left(\frac{\beta_{ed}}{\beta_c}\right)^2_{Max} = \left(\frac{\sqrt{29}}{15}\right)^2$$

So the maximum quantized gain factor ratio $$\left(\frac{\beta_{ed}}{\beta_c}\right)_{Max}$$

E-DPDCH/DPCCH value is:

$$\left(\frac{\beta_{ed}}{\beta_c}\right)_{Max} = \left(\frac{\sqrt{29}}{15}\right)$$

From this maximum authorized gain factor ratio, TFC selection is launched on E-DCH (E-TFC selection) to select an E-TFC for which the gain factor satisfies the following condition:

$$\left(\frac{\beta_{ed}}{\beta_c}\right) \leq \left(\frac{\sqrt{29}}{15}\right)$$

In conclusion, in case no UE Tx power is reserved for E-DPDCH during TFC selection on DPDCH (current specification)

$$\left(\frac{\beta_d}{\beta_c}\right) = 1$$

(DPDCH/DPCCH gain factor ratio).

In case UE Tx power is reserved for E-DPDCH, E-DPCCH (to respect minimum set) during TFC selection on DPDCH, thanks to the invention, $$\left(\frac{\beta_d}{\beta_c}\right) = \frac{14}{15}$$

(DPDCH/DPCCH gain factor ratio).

The invention claimed is:

1. A method for optimizing a Transport Format Combination (TFC) selection procedure processed by a user equipment (UE) in an uplink communication in a mobile telecommunication network, wherein a TFC procedure during a current TTI (Transmission Time Interval) is performed in a function of:
   a remaining power measured after the TFC procedure is performed in a past TTI, as a previous TTI of the current TTI;
   a power for transmitting E-DCH (Enhanced Dedicated Control Channel) channels in the past TTI; and
   a minimum specified power for transmitting the E-DCH channels in a next TTI, as a subsequent TTI to the current TTI,
   wherein a first TFC for DCH (Dedicated Control Channel) channels is selected based on a condition of a gain factor ratio of the DCH channels in relation to a maximum gain power ratio of the DCH channels in which the minimum specified power for transmitting the, E-DCH channels having been considered, and a second TFC for the E-DCH channels is selected based on a condition of a gain factor ratio of the, E-DCH channels in relation to a maximum authorized gain factor ratio of the E-DCH channels which is computed based on the selected first TFC;
   wherein the pain factor ratio of the DCH channels is expressed by $(\beta_d/\beta_c)$ where $\beta d$ is a gain factor on the DPDCH channels and $\beta c$ is a gain factor on the DPCCH channels, the maximum gain power, ratio of the DCH channels is expressed by $(\beta_d/\beta_c)^2_{MAX}$ gain factor ratio of the E-DCH channels is expressed by $(\beta_{cd}/\beta_c)$, where $\beta_{cd}$ is a gain factor on the E-DPDCH channels, and the maximum authorized gain factor ratio of the E-DCH channels is expressed by $(\beta_{cd}/\beta_c)_{MAX}$.

2. The method according to claim 1, wherein the DCH channels comprise at least one of DPDCH (Dedicated Physical Data Channel) channels and DPCCH (Dedicated Physical Data Control Channel) channels and the E-DCH channels comprise at least one of E-DPDCH (Enhanced Dedicated Physical Data Channel) channels and a E-DPCCH (Enhanced Dedicated Physical Data Control Channel) channels,
   and wherein the condition of selecting the first TFC is that $(\beta_d/\beta_c)$ is equal to or smaller $(\beta_d/\beta_c)^2_{MAX}$, and the condition of selecting the second TFC is that $(\beta_{cd}/\beta_c)$, smaller than $(\beta_{cd}/\beta_c)_{MAX}$.

3. The method according to claim 1, wherein, in computing the maximum gain power ratio $(\beta_d/\beta_c)^2_{MAX}$, of the DCH channels, a minimum needed UE power to be left for HS-DPCCH (High-Speed Dedicated Physical Data Control Channel) channels, the E-DPCCH channels, and the E-DPDCH channels is considered.

4. A user equipment for communication in a mobile telecommunication network, wherein said User Equipment comprises:
   means for performing a TFC (Transport Format Combination) procedure and an E-TFC (Enhanced Transport Format Combination) procedure during a current TTI (Transmission Time Interval) taking into account a remaining power measured after the TFC procedure is performed in the past TTI, a power for transmitting E-DCH (Enhanced Dedicated Control Channel) channels in a past TII, as a previous TTI of the current TTI, and a minimum specified power for transmitting E-DCH (Enhanced Dedicated Control Channel) channels in a next TTI, as a subsequent TTI to the current TTI wherein a first TFC for DCH (Dedicated Control Channel) channels is selected based on a condition of a gain factor ratio of the DCH channels in relation to a maximum gain power ratio of the DCH channels in which the minimum specified power for transmitting the, E-DCH channels having been considered, and a second TFC for the E-DCH channels is selected based on a condition of a gain factor ratio of the, E-DCH channels in relation to a maximum authorized gain factor ratio of the E-DCH channels which is computed based on the selected first TFC;

wherein the pain factor ratio of the DCH channels is expressed by $(\beta_d/\beta_c)$ where $\beta d$ is a gain factor on the DPDCH channels and $\beta c$ is a gain factor on the DPCCH channels, the maximum gain power, ratio of the DCH channels is expressed by $(\beta_d/\beta_c)^2{}_{MAX}$ gain factor ratio of the E-DCH channels is expressed by $(\beta_{cd}/\beta_c)$, where $\beta_{cd}$ is a gain factor on the E-DPDCH channels, and the maximum authorized gain factor ratio of the E-DCH channels is expressed by $(\beta_{cd}/\beta_c)_{MAX}$.

5. The user equipment according to claim 4, wherein the DCH channels comprises at least one of DPDCH (Dedicated Physical Data Channel) channels and DPCCH (Dedicated Physical Data Control Channel) channels and the E-DCH channels comprise at least one of E-DPDCH (Enhanced Dedicated Physical Data Channel) channels and a E-DPCCH (Enhanced Dedicated Physical Data Control Channel) channels, and wherein the condition of selecting the first TFC is that $(\beta_d/\beta_c)$ is equal to or smaller $(\beta_d/\beta_c)_{MAX}$, and the condition of selecting the second TFC is that $(\beta_{cd}/\beta_c)$, smaller than $(\beta_{cd}/\beta_c)_{MAX}$.

* * * * *